United States Patent
Okajima

(10) Patent No.: US 11,625,617 B2
(45) Date of Patent: Apr. 11, 2023

(54) REDUCTION OF EDGES IN A KNOWLEDGE GRAPH FOR ENTITY LINKING

(71) Applicant: FUJITSU LIMITED, Kawasaki (JP)

(72) Inventor: Seiji Okajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 290 days.

(21) Appl. No.: 16/866,657

(22) Filed: May 5, 2020

(65) Prior Publication Data
US 2020/0356867 A1  Nov. 12, 2020

(30) Foreign Application Priority Data

May 10, 2019 (JP) .............................. JP2019-089939

(51) Int. Cl.
*G06F 40/12* (2020.01)
*G06N 5/02* (2023.01)
*G06K 9/62* (2022.01)

(52) U.S. Cl.
CPC .............. *G06N 5/02* (2013.01); *G06F 40/12* (2020.01); *G06K 9/6224* (2013.01); *G06K 9/6296* (2013.01)

(58) Field of Classification Search
CPC .......... G06N 5/02; G06N 5/022; G06N 20/00; G06K 9/6224; G06K 9/6296; G06V 10/768
See application file for complete search history.

(56) References Cited

U.S. PATENT DOCUMENTS 9,710,544 B1* 7/2017 Smith ..................... G06F 16/36
2014/0351289 A1* 11/2014 Bekas ................. G06F 16/9024
707/798
(Continued)

FOREIGN PATENT DOCUMENTS

JP  2012-043294 A  3/2012
JP  2014-229047 A  12/2014
(Continued)

OTHER PUBLICATIONS

Simone Paolo Ponzetto et al., "Knowledge-rich Word Sense Disambiguation Rivaling Supervised Systems", Proceedings of the 48th Annual Meeting of the Association for Computational Linguistics, pp. 1522-1531, Uppsala, Sweden, Jul. 11-16, 2010 (Total 10 pages).

*Primary Examiner* — Jesse S Pullias
(74) *Attorney, Agent, or Firm* — Fujitsu Patent Center

(57) ABSTRACT

An apparatus links an entity in a first knowledge-graph with a word in a text. The apparatus, based on a number of first-edges coupled to each of first-nodes serving as a transition-source and a number of second-edges coupled to each of second-nodes serving as a transition-destination in the first knowledge-graph, identifies a third-edge to be deleted from edges coupled to a third-node among the second-nodes which has a preset input-order indicating a number of edges that transition to the third-node, and generates a second knowledge-graph by deleting the third-edge from the first knowledge-graph. The apparatus couples first and second nodes which have been coupled to each other by the third-edge in the first knowledge-graph, via a fourth-node to which the first and second nodes are coupled by edges in the second knowledge-graph, and provides the word in the text and the entity linked with the word to a user.

4 Claims, 18 Drawing Sheets

(56) References Cited

U.S. PATENT DOCUMENTS

2015/0120623 A1* 4/2015 Morara ................. G06N 5/003
    706/12
2015/0339835 A1* 11/2015 Mohr ................. G06F 16/9024
    345/440
2017/0221240 A1* 8/2017 Stetson ................ G06F 40/137

FOREIGN PATENT DOCUMENTS

| JP | 2014-241122 A | 12/2014 |
| JP | 2017-004097 A | 1/2017 |

* cited by examiner

FIG. 7A

REMAINING NUMBER OF EDGES TO BE REDUCED: 10

|  | INPUT ORDER | NUMBER OF PREDICATES | ASSIGNMENT NUMBER<br>NUMBER OD PREDICATES TRANSITIONING TO CLUSTER | ASSIGNMENT NUMBER |
|---|---|---|---|---|
| CLUSTER A | 5 | 5 |  | 0 |
| CLUSTER B | 4 | 4 |  | 0 |
| CLUSTER C | 2 | 8 |  | 0 |
| CLUSTER D | 1 | 4 |  | 0 |
| CLUSTER E | 0 | 0 |  | 0 |

REMAINING NUMBER OF EDGES TO BE REDUCED: 7

|  | NUMBER OF PREDICATES | ASSIGNMENT NUMBER<br>NUMBER OD PREDICATES TRANSITIONING TO CLUSTER | ASSIGNMENT NUMBER |
|---|---|---|---|
| CLUSTER A | 5 | 1/5 | 1 |
| CLUSTER B | 4 | 1/4 | 1 |
| CLUSTER C | 8 | 1/8 | 1 |
| CLUSTER D | 4 |  | 0 |
| CLUSTER E | 0 |  | 0 |

— a1

REMAINING NUMBER OF EDGES TO BE REDUCED: 6

|  | NUMBER OF PREDICATES | ASSIGNMENT NUMBER<br>NUMBER OD PREDICATES TRANSITIONING TO CLUSTER | ASSIGNMENT NUMBER |
|---|---|---|---|
| CLUSTER A | 5 | 1/5 | 1 |
| CLUSTER B | 4 | 1/4 | 1 |
| CLUSTER C | 8 | (2/8) | 2 |
| CLUSTER D | 4 |  | 0 |
| CLUSTER E | 0 |  | 0 |

REMAINING NUMBER OF EDGES TO BE REDUCED: 5

|  | NUMBER OF PREDICATES | ASSIGNMENT NUMBER<br>NUMBER OD PREDICATES TRANSITIONING TO CLUSTER | ASSIGNMENT NUMBER |
|---|---|---|---|
| CLUSTER A | 5 | (2/5) | 2 |
| CLUSTER B | 4 | 1/4 | 1 |
| CLUSTER C | 8 | 2/8 | 2 |
| CLUSTER D | 4 |  | 0 |
| CLUSTER E | 0 |  | 0 | a2, a3, a4

FIG. 7B

REMAINING NUMBER OF EDGES TO BE REDUCED: 3

| | NUMBER OF PREDICATES | ASSIGNMENT NUMBER | |
|---|---|---|---|
| | | NUMBER OF PREDICATES TRANSITIONING TO CLUSTER | ASSIGNMENT NUMBER |
| CLUSTER A | 5 | 2/5 | 2 |
| CLUSTER B | 4 | (2/4) | 2 |
| CLUSTER C | 8 | (3/8) | 3 |
| CLUSTER D | 4 | 0 | 0 |
| CLUSTER E | 0 | 0 | 0 |

REMAINING NUMBER OF EDGES TO BE REDUCED: 2

| | NUMBER OF PREDICATES | ASSIGNMENT NUMBER | |
|---|---|---|---|
| | | NUMBER OF PREDICATES TRANSITIONING TO CLUSTER | ASSIGNMENT NUMBER |
| CLUSTER A | 5 | 2/5 | 2 |
| CLUSTER B | 4 | 2/4 | 2 |
| CLUSTER C | 8 | (4/8) | 4 |
| CLUSTER D | 4 | 0 | 0 |
| CLUSTER E | 0 | 0 | 0 |

REMAINING NUMBER OF EDGES TO BE REDUCED: 1

| | NUMBER OF PREDICATES | ASSIGNMENT NUMBER | |
|---|---|---|---|
| | | NUMBER OF PREDICATES TRANSITIONING TO CLUSTER | ASSIGNMENT NUMBER |
| CLUSTER A | 5 | (3/5) | 3 |
| CLUSTER B | 4 | 2/4 | 2 |
| CLUSTER C | 8 | 4/8 | 4 |
| CLUSTER D | 4 | 0 | 0 |
| CLUSTER E | 0 | 0 | 0 |

REMAINING NUMBER OF EDGES TO BE REDUCED: 0

| | NUMBER OF PREDICATES | ASSIGNMENT NUMBER | |
|---|---|---|---|
| | | NUMBER OF PREDICATES TRANSITIONING TO CLUSTER | ASSIGNMENT NUMBER |
| CLUSTER A | 5 | 3/5 | 3 |
| CLUSTER B | 4 | 3/4 | 3 |
| CLUSTER C | 8 | 4/8 | 4 |
| CLUSTER D | 4 | 0 | 0 |
| CLUSTER E | 0 | 0 | 0 |

US 11,625,617 B2

REDUCTION OF EDGES IN A KNOWLEDGE GRAPH FOR ENTITY LINKING

CROSS-REFERENCE TO RELATED APPLICATION

This application is based upon and claims the benefit of priority of the prior Japanese Patent Application No. 2019-89939, filed on May 10, 2019, the entire contents of which are incorporated herein by reference.

FIELD

The embodiment discussed herein is related to reduction of edges in a knowledge graph for entity linking.

BACKGROUND

In the natural language processing, a technique referred to as entity linking is known as a technique for linking a word with a knowledge base which is knowledge information (for example, Japanese Laid-open Patent Publication Nos. 2012-43294, 2017-4097, 2014-229047, and 2014-241122). In the entity linking technique, a word in a text is linked with an entity in a knowledge graph which is a knowledge base.

An example of an entity linking procedure is as follows. A device that performs entity linking pre-scores each of entities (nodes) in the knowledge base using any method. The device extracts a word from an input sentence that is input. The device scores sets of the words and the respective nodes from the knowledge base, and links the word and the node in the set with the highest score.

The related art is also described in "Knowledge-rich Word Sense Disambiguation Rivaling Supervised Systems" [2010].

SUMMARY

According to an aspect of the embodiments, an apparatus links an entity in a first knowledge graph with a word in a text. The apparatus, based on a number of first edges coupled to each of first nodes that serve as a transition source and a number of second edges coupled to each of second nodes that serve as a transition destination in the first knowledge graph, identifies a third edge to be deleted from edges coupled to a third node among the second nodes which has a preset input order indicating a number of edges that transition to the third node, and generates a second knowledge graph by deleting the third edge from the first knowledge graph. The apparatus couples a first node among the first nodes and a second node among the second nodes which have been coupled to each other by the third edge in the first knowledge graph, via a fourth node to which the first node and the second node are coupled by edges in the second knowledge graph, and provides the word in the text and the entity linked with the word to a user.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7A is a diagram (1) illustrating an example of reduction number assignment according to the embodiment;

FIG. 7B is a diagram (2) illustrating an example of the reduction number assignment according to the embodiment;

DESCRIPTION OF EMBODIMENTS

In entity linking, if the number of edges in a knowledge graph is large, an amount of information to be referred to at the time of score calculation increases, thus increasing an amount of calculation. Therefore, in order to reduce the amount of calculation, it is conceivable to delete, by using the scores, edges from the knowledge graph in ascending order of the scores. However, if the score is used to delete an edge from the knowledge graph, an edge between nodes that are otherwise to be coupled may be deleted. An edge coupled to a high-order node has a small score and thus is likely to be deleted. When the edge is deleted, an impact on the score calculation is minor as far as there is a coupling through another node. If there is no coupling through another node, however, the impact on the score calculation is substantial.

In one aspect, it is desirable to reduce an amount of information in a knowledge graph while maintaining accuracy of entity linking.

Hereinafter, an embodiment of an entity linking method, an information processing apparatus, and an entity linking program disclosed in the present application is described in detail with reference to the drawings. The present disclosure is not limited by the embodiment.

Embodiment

Figure 16:
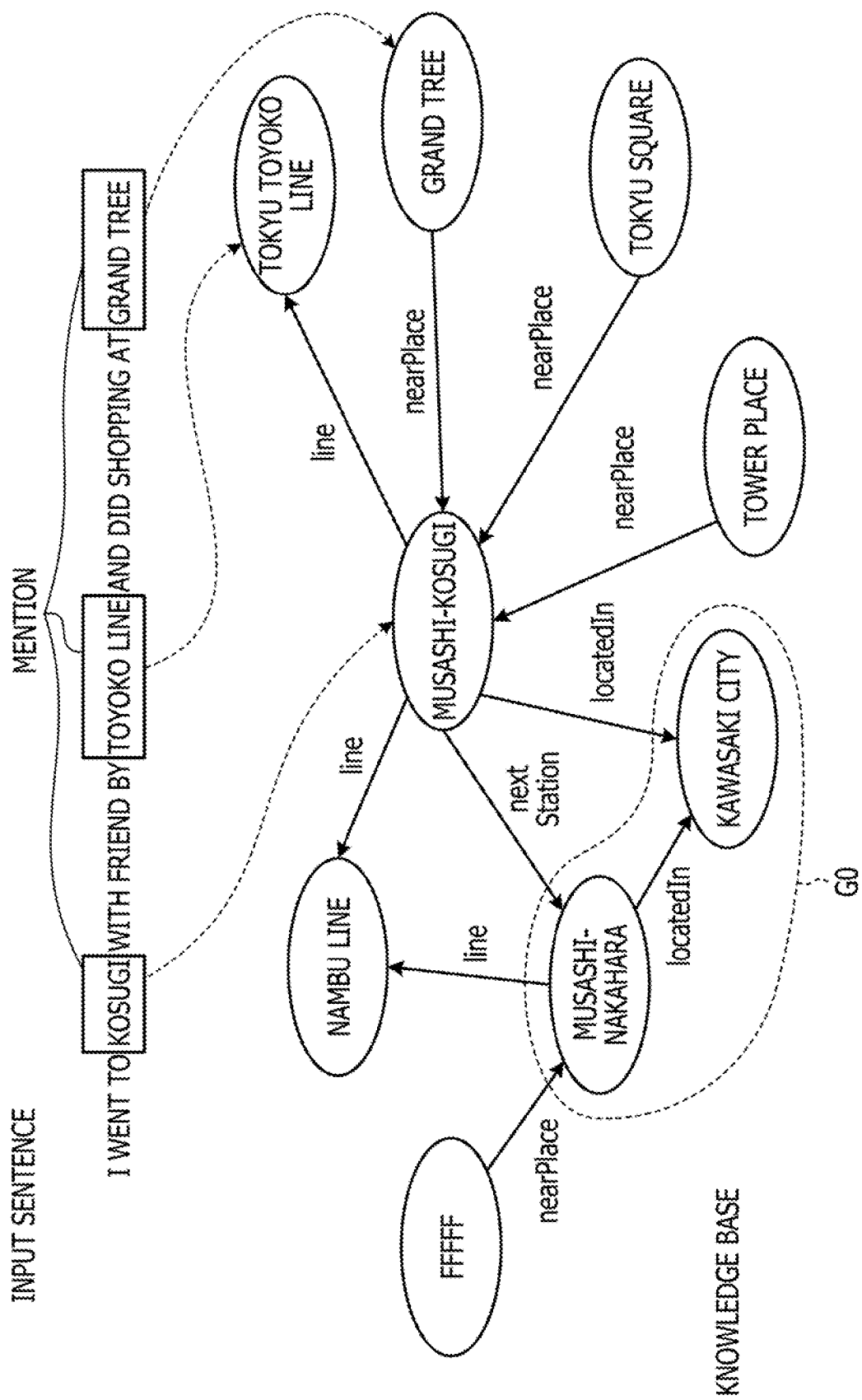
FIG. 16 is a diagram illustrating a reference example of entity linking.

First, a concept of an issue of entity linking using a knowledge base is described with reference to FIG. 16 and FIG. 17. FIG. 16 is a diagram illustrating a reference example of the entity linking. As illustrated in FIG. 16, an input sentence and a knowledge base are illustrated. The knowledge base is represented by a knowledge graph. A knowledge graph is a graph in which each entity is represented as a node, and that has a score between entities as a weight of an edge. For example, in the entity linking, a mention (word) in an input sentence is linked with an entity (node) in the knowledge graph, which is the knowledge base, by using a weight of an edge.

In the knowledge base, one piece of information is expressed by a set of three elements of a subject, a predicate, and an object. For example, as Indicated by a symbol G0, the one piece of information is expressed by "Musashi-Nakahara" serving as a subject, "locatedIn" serving as a predicate, and "Kawasaki City" serving as an object. Individual pieces of information are visualized as a graph. The subject and the object are expressed by nodes, and the predicate is expressed by an edge.

In the entity linking, when the input sentence is, for example, "I went to Kosugi by Toyoko Une and did shopping at Grand Tree", "Toyoko Line" in the input sentence and the node "Tokyu Toyoko Une" in the knowledge base are linked using the score. "Kosugi" in the input sentence and the node "Musashi-Kosugi" in the knowledge base are linked using the score. "Grand Tree" in the input sentence and the node "Grand Tree" in the knowledge base are linked using the score.

Figure 17:
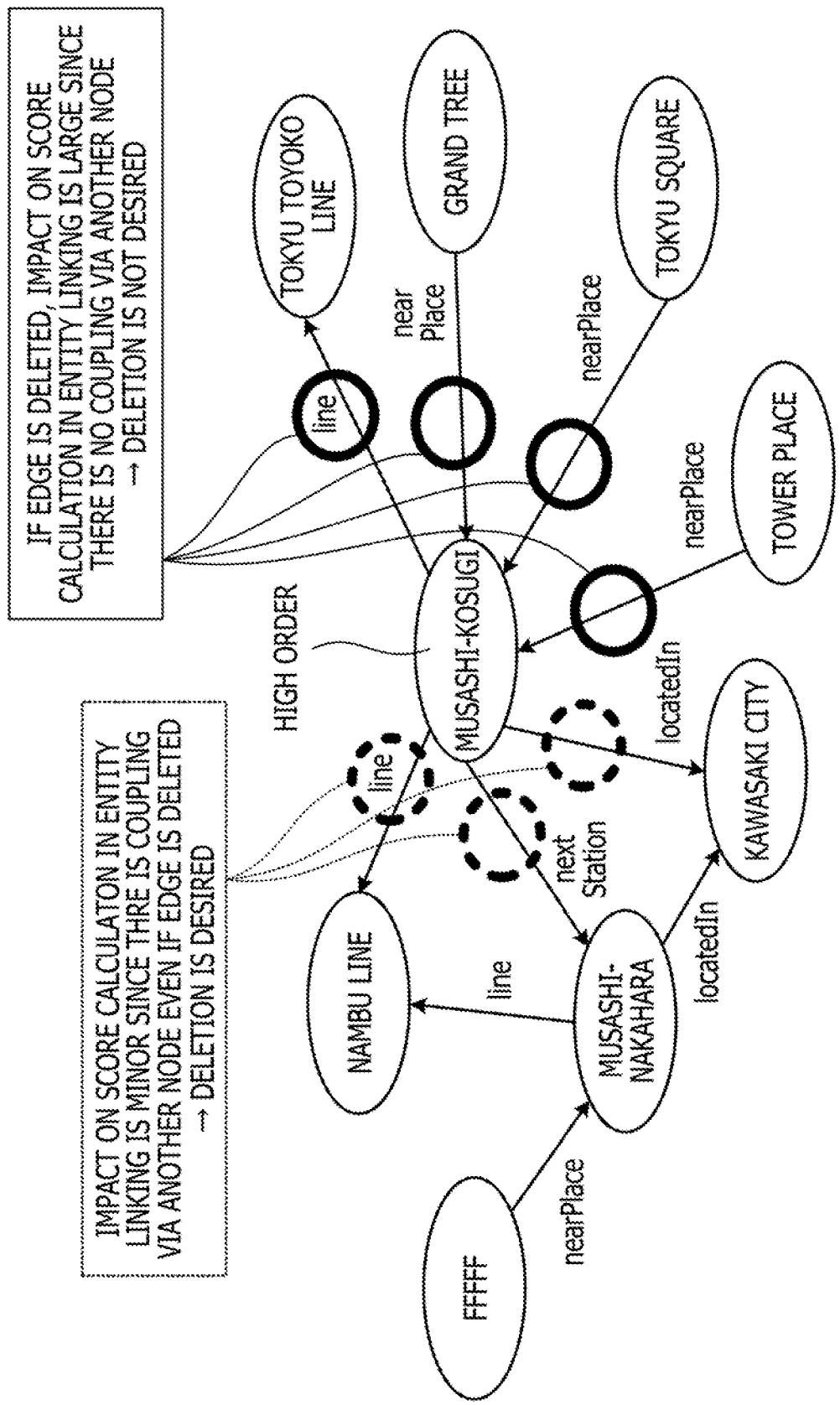
FIG. 17 is a diagram illustrating an issue of a concept of the entity linking.

FIG. 17 is a diagram illustrating an issue of the concept of the entity linking. As illustrated in FIG. 17, when the score is used to delete an edge from the knowledge graph, an edge between nodes that are to be otherwise coupled may be deleted. For example, an edge coupled to a high-order node has a small score, so that the edge is likely to be deleted. For example, in FIG. 17, suppose that the node "Musashi-Kosugi" assigned a higher order than other nodes. The edges that respectively transition to "Nambu Une", "Musashi-Nakahara", and "Kawasaki City", coupled to the node "Musashi-Kosugi", are likely to be deleted. The edges that respectively transition to "Tokyu Toyoko Une", "Grand Tree", "Tokyu Square", and "tower place" are likely to be deleted.

When any edge with a small score is deleted, an impact on score calculation is minor if nodes are coupled not directly but indirectly by edges. However, when any edge with a small score is deleted, there may be a case where the nodes are neither coupled directly nor indirectly by the edges. In such a case, the impact on the score calculation is large. For example, accuracy of the entity linking is degraded. For example, in FIG. 17, even if the edge that transitions from the node "Musashi-Kosugi" to the node "Nambu Une" is deleted, the nodes are indirectly coupled by the edges such as "Musashi-Kosugi"→"Musashi-Nakahara"→"Nambu Line". Thus, the impact on the score calculation is minor. However, if the edge that transitions from the node "Musashi-Kosugi" to the node "Tokyu Toyoko Line is deleted, the nodes are neither coupled directly nor indirectly by the edges. Thus, the impact on the score calculation is large. For example, accuracy of the entity linking is degraded. For example, there is an issue that the accuracy of the entity linking is degraded if an edge is deleted in order to reduce the amount of information in the knowledge graph.

Hereinafter, an information processing apparatus for reducing an amount of information in a knowledge graph while maintaining the accuracy of entity linking is described.

[Configuration of Information Processing Apparatus]

Figure 1:
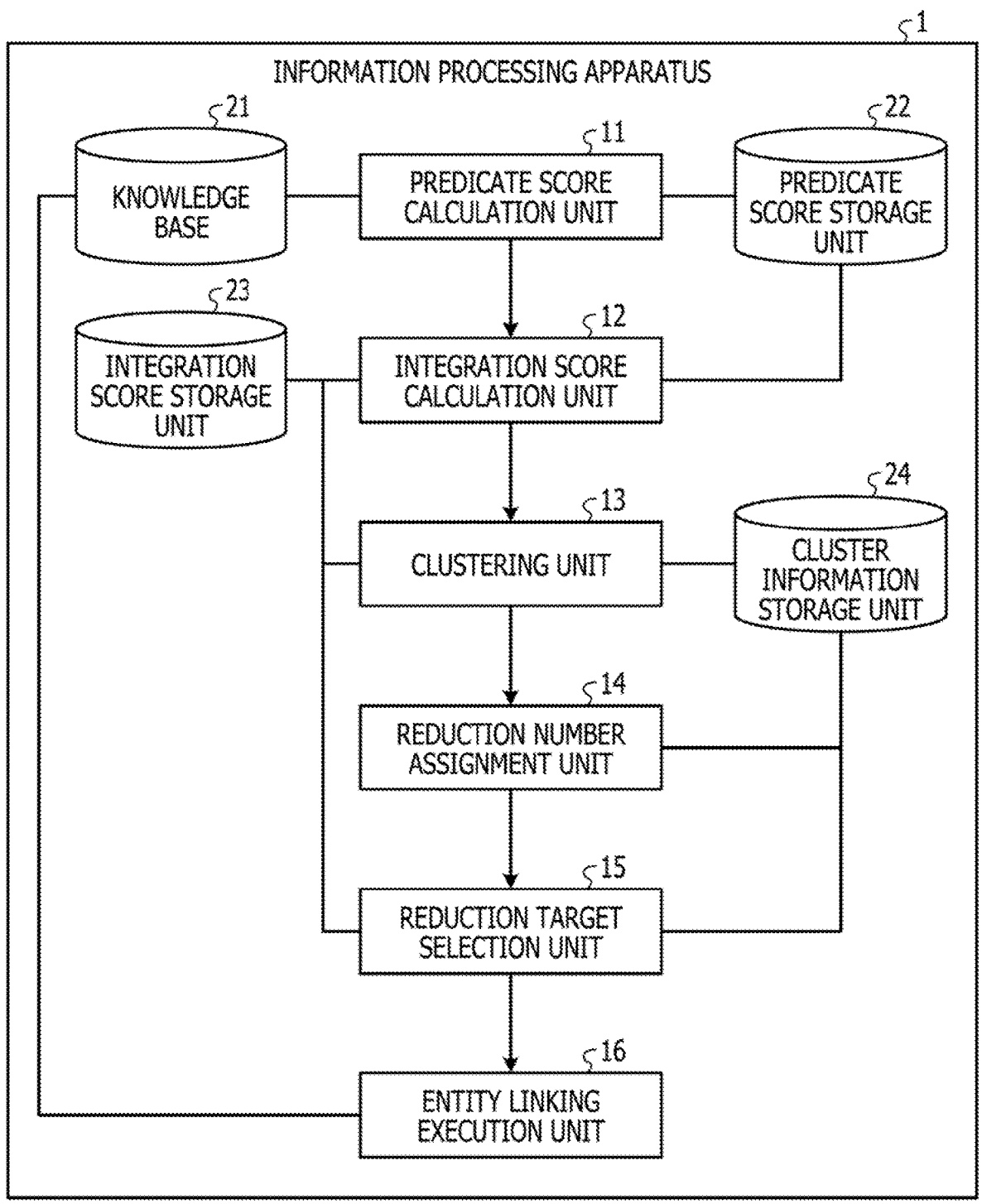
FIG. 1 is a block diagram illustrating a functional configuration of an information processing apparatus according to an embodiment.

FIG. 1 is a block diagram illustrating a functional configuration of the information processing apparatus according to an embodiment. As illustrated in FIG. 1, an information processing apparatus 1 includes a predicate score calculation unit 11, an integration score calculation unit 12, a dustering unit 13, a reduction number assignment unit 14, a reduction target selection unit 15, and an entity linking execution unit 16. These functional units are included in a controller (not illustrated). The controller corresponds to an electronic circuit such as a central processing unit (CPU). The controller includes an internal memory for storing control data and programs that define various processing procedures. The controller performs various processes based on these programs and control data. The predicate score calculation unit 11 to the reduction target selection unit 15 are an example of a specifying unit. The entity linking execution unit 16 is an example of a generation unit and a presentation unit.

The information processing apparatus 1 includes a knowledge base 21, a predicate score storage unit 22, an integration score storage unit 23, and a duster information storage unit 24. These functional units are included in a storage unit (not illustrated). The storage unit is, for example, a semiconductor memory element such as a random-access memory (RAM) or a flash memory, or a storage device such as a hard disk or an optical disk.

The knowledge base 21 indicates information of a knowledge graph. The knowledge base 21 is stored in advance in the storage unit.

The predicate score storage unit 22 stores a score of a predicate included in the knowledge base 21. The predicate score storage unit 22 is generated by the predicate score calculation unit 11.

The integration score storage unit 23 stores an integration score of a predicate (edge) included in the knowledge base 21. The integration score storage unit 23 is generated by the integration score calculation unit 12.

The duster information storage unit 24 stores duster information indicating a result of dustering an entity according to an input order of a predicate. For example, the duster information is information indicating the result of dustering a node in the knowledge graph according to the input order of an edge. The duster information storage unit 24 is generated by the dustering unit 13.

The predicate score calculation unit 11 calculates a score of a predicate in the knowledge base 21. For example, the predicate score calculation unit 11 calculates, as a score, importance of a predicate when viewed from an object. For example, when $P(o_p)$ denotes a probability that a predicate p transitions to an object $o_p$, the predicate score calculation unit 11 calculates a score $H_{op}(p)$ of the predicate p that transitions to the object $o_p$ in a manner as illustrated in the following equation (1). The predicate corresponds to the edge in the knowledge graph.

$$H_{op}(p) = -\log_2 p(o_p) \tag{1}$$

For example, the score $H_{op}(p)$ of the predicate p is calculated as an amount of information when the predicate p transitions to the object $o_p$. As the probability $P(o_p)$ that the predicate p transitions to the object $o_p$ becomes higher, the amount of information becomes smaller. For example, information indicated by the amount of information becomes more ambiguous. The probability $P(o_p)$ being high indicates that the object serving as a transition destination of the predicate p is often $o_p$ when the predicate p is present. For example, the object $o_p$ is less helpful as information for identifying the subject serving as a transition source of the predicate p. Therefore, the predicate that is less helpful as the information for identifying the subject when viewed from the object is determined as the predicate to be deleted.

Figure 2:
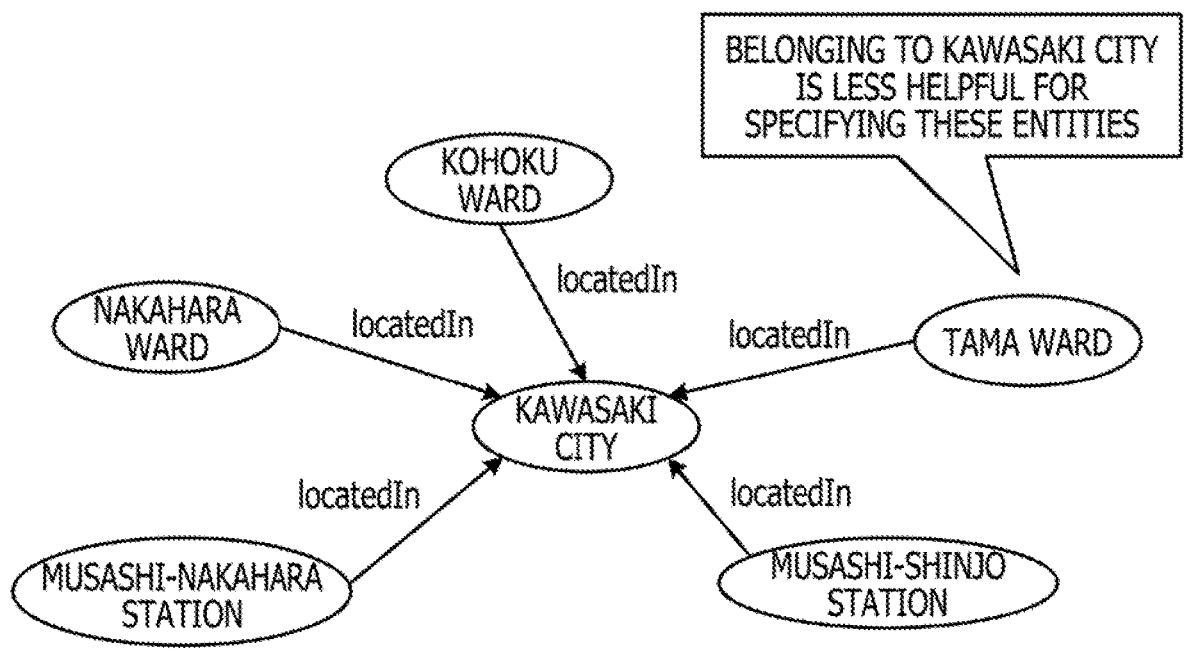
FIG. 2 is a diagram (1) explaining a concept of predicate reduction.

FIG. 2 is a diagram (1) illustrating a concept of predicate reduction. As illustrated in FIG. 2, when the object $o_p$ is "Kawasaki City", the amount of information becomes smaller as the probability that "locatedIn" serving as the predicate p transitions to "Kawasaki City" serving as the object is higher. For example, the object $o_p$, which is "Kawasaki City", is less helpful as the information for identifying each entity (subject) indicating the transition source of the predicate p which is "locatedIn". This is because the amount of information is small and the information indicated by the amount of information is ambiguous. Hence, it is desirable to delete the predicate whose amount of information is small when viewed from the object. Even if an edge is deleted only with such an idea of the predicate reduction, nodes (entities) may neither be coupled directly nor indirectly by the edge. Thus, the idea of the predicate reduction is inadequate for overcoming the issue that the accuracy of the entity linking is degraded.

Referring back to FIG. 1, the integration score calculation unit 12 calculates an integration score of a predicate in the knowledge base 21. For example, the integration score calculation unit 12 calculates, as the integration score, relative importance of the predicate when viewed from the subject. For example, the integration score calculation unit 12 calculates an integration score $I(p_x)$ of a predicate $p_x$ having a subject s in a manner as in the following equation (2), where n denotes an output order of the subject s and $H_{opn}(p_n)$ denotes the score of the predicate $p_n$ corresponding to the object on of the subjects. The term "output order" as used herein means an order of an edge which transitions (exits) from a node of a subject serving as a transition source.

$$I(p_x) = \frac{H_{opx}(p_x)}{\frac{1}{n}\sum_n H_{opn}(p_n)} \quad (2)$$

For example, the integration score $I(p_x)$ of the predicate $p_x$ is calculated as a result of dividing a value of importance (score) of the predicate $p_x$ by a mean value of values of the importance (scores) of n predicates possessed by the subject corresponding to the predicate $p_x$, in order to reflect the importance of each of the predicates when viewed from the subject. Division of the importance (score) of the predicate $p_x$ by the mean value of the importance (scores) of the n predicates increases the integration score $I(p_x)$ of the predicate $p_x$ having a relatively large value of the importance (score) of the predicate among the n predicates. For example, among the n predicates, the predicate $p_x$ having the relatively large value of the importance (score) of the predicate is more helpful as the information for identifying the subject than other predicates possessed by the subject, when viewed from the subject. This is because the importance is relatively high when viewed from the subject. Therefore, in the embodiment, the predicate with the relatively low importance when viewed from the subject is selected as a predicate to be deleted.

Figure 3:
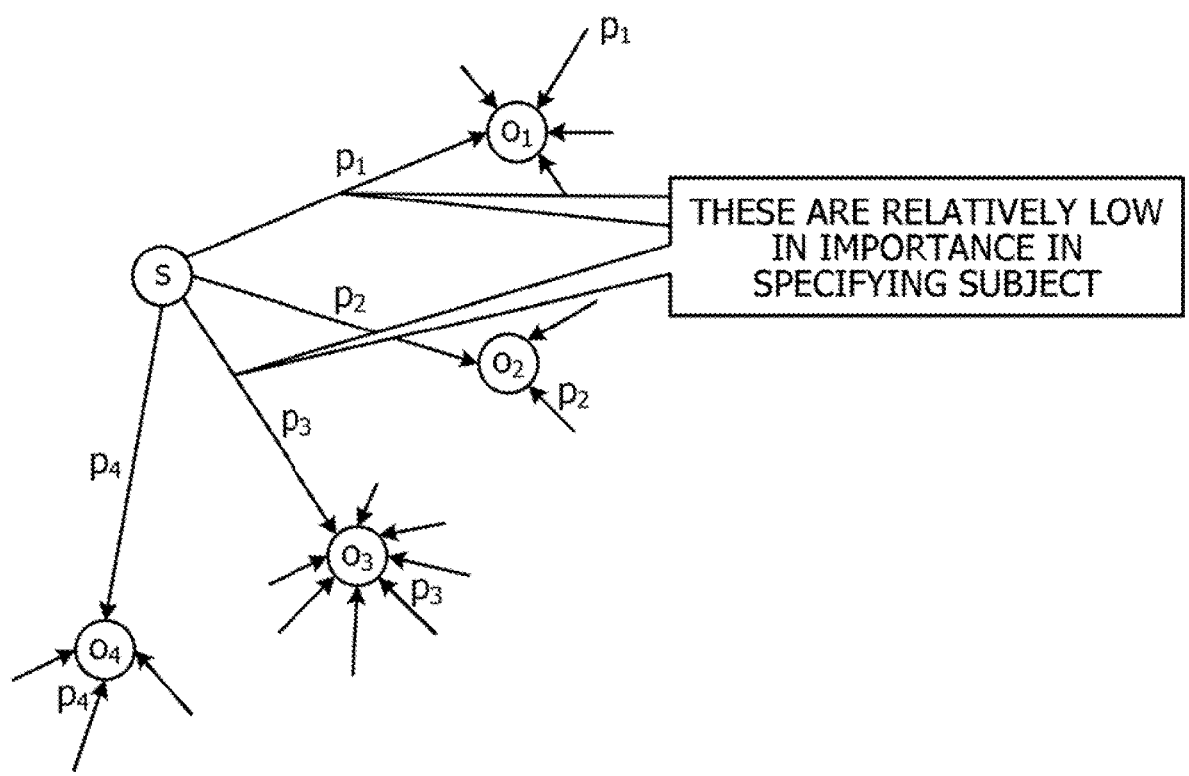
FIG. 3 is a diagram (2) explaining the concept of predicate reduction.

FIG. 3 is a diagram (2) illustrating the concept of the predicate reduction. As illustrated in FIG. 3, suppose that predicates $p_1, p_2, p_3$, and $p_4$ respectively transition to objects $o_1, o_2, o_3$, and $o_4$ from the subjects. Suppose that the importance (score) of the predicate $p_1$ is $H_{op1}(p_1)$. Suppose that the importance (score) of the predicate $p_2$ is $H_{op2}(p_2)$. Suppose that the importance (score) of the predicate $p_3$ is $H_{op3}(p_3)$. Suppose that the importance (score) of the predicate $p_4$ is $H_{op4}(p_4)$. Suppose that the importance (score) of the predicate $p_1$ and the importance (score) of the predicate $p_3$ are lower than those of the other predicates $p_2$ and $p_4$. The predicate $p_1$ and the predicate $p_3$ are relatively low in importance in specifying the subject s. Therefore, it is desired to delete the predicates having the relatively low importance when viewed from the subject. Even if a node is deleted only with such an idea of the predicate reduction, as with the idea of the predicate reduction described in FIG. 2, nodes (entities) may neither be coupled directly nor indirectly by the edge. Thus, the idea of the predicate reduction is inadequate for overcoming the issue that the accuracy of the entity linking is degraded.

Referring back to FIG. 1, the dustering unit 13 dusters an entity of an object according to the input order of a predicate that transitions to the object. The term "input order" as used herein means an order of an edge that transitions to a node of a transition destination (object).

The reduction number assignment unit 14 assigns the number of predicates to be reduced corresponding to the total number of predicates to be reduced, to a predicate set that transitions to each duster. For example, in each duster, the reduction number assignment unit 14 assigns the number of edges to be reduced to a set of edges that transition to a transition destination (object) node included in the duster.

For example, the reduction number assignment unit 14 excludes a duster having a predicate input order of 0 or 1 from dusters to which the number of predicates to be reduced is assigned. This is because when the number of edges to be reduced is assigned to a duster having the predicate input order of 0 or 1, an edge between nodes that are otherwise to be coupled to each other is certainly deleted, so that the nodes are neither coupled directly nor indirectly by the edge. The reduction number assignment unit 14 assigns the number of predicates to be reduced corresponding to a predetermined total number of predicates to be reduced to each predicate set that transitions to a corresponding duster having the predicate input order of 2 or larger. As an example, first, the reduction number assignment unit 14 assigns "1" to each duster as an assignment number. The reduction number assignment unit 14 calculates, for each duster, the assignment number/the number of predicates that transition to the duster. The reduction number assignment unit 14 adds 1 to the assignment number of the duster having the smallest calculation result. The reduction number assignment unit 14 repeatedly continues the calculation of the assignment for each duster until the total assignment number reaches the predetermined total number of predicates to be reduced.

The reduction target selection unit 15 selects a predicate to be reduced. For example, for a set of edges in each duster, the reduction target selection unit 15 selects, as edges to be reduced, as many edges as the number of edges to be reduced that is assigned to the duster, in ascending order of the integration score. For example, for a set of edges in each duster, the reduction target selection unit 15 selects in sequence as many edges having the low predicate importance as the number of edges to be reduced that is assigned to the duster. The reduction target selection unit 15 deletes the edges to be reduced in the knowledge graph.

The entity linking execution unit 16 executes the entity linking. For example, the entity linking execution unit 16 links a word in an input sentence with an entity of a newly generated knowledge graph. For example, the entity linking execution unit 16 couples a subject node and a predicate node that are otherwise coupled by a deleted edge, via a node coupled by an undeleted edge, and links the word in the input sentence with the node of the generated knowledge graph.

The entity linking execution unit 16 presents the word in the input sentence and the linked entity to a user.

An example of the entity linking according to the embodiment is described with reference to FIG. 4 to FIG. 9. In FIG. 4 to FIG. 9, a description is given, using the knowledge graph relating to a region around "Musashi-Kosugi" as the knowledge base.

[Example of Predicate Score Calculation]

Figure 4:
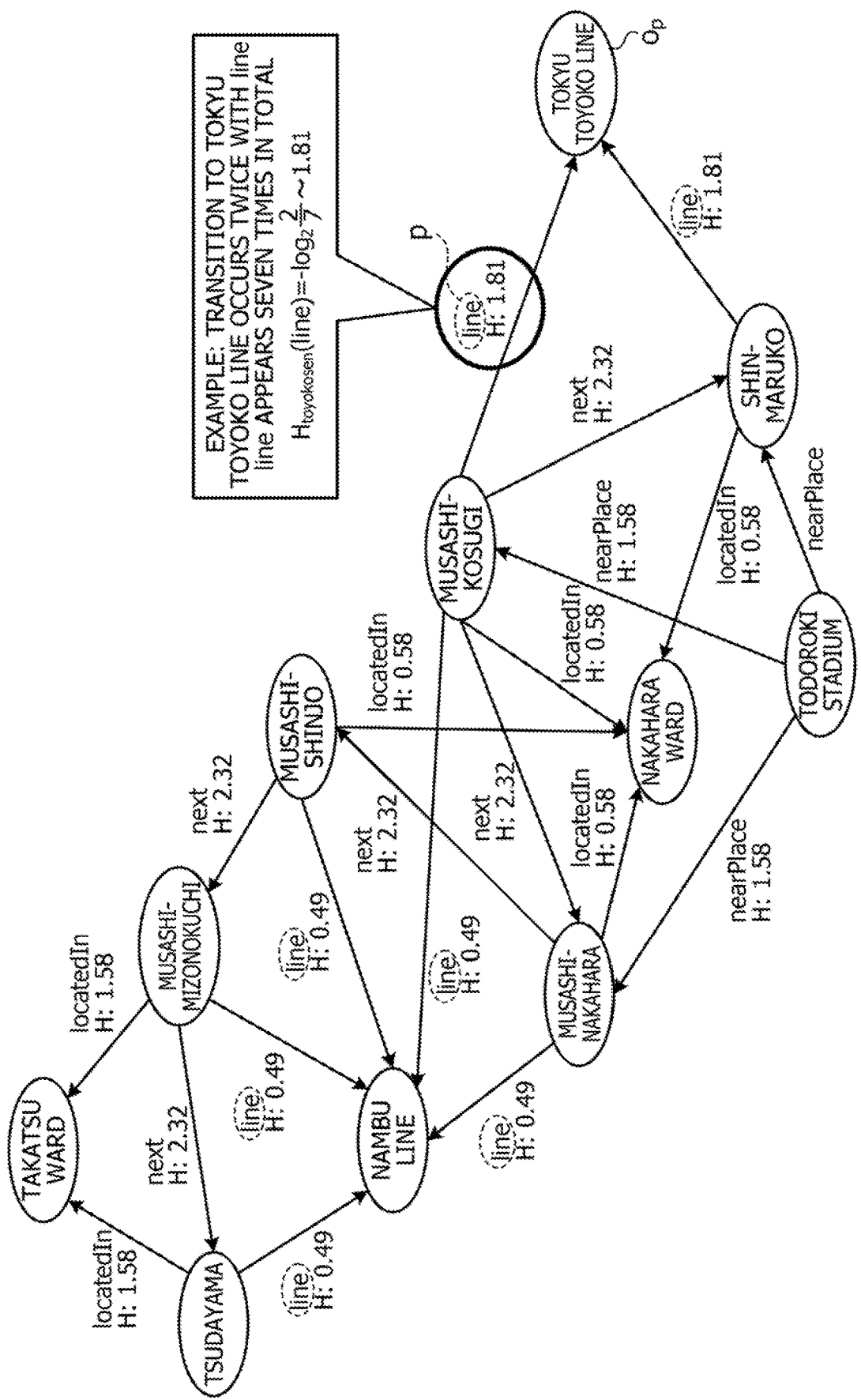
FIG. 4 is a diagram illustrating an example of a predicate score calculation according to the embodiment.

FIG. 4 is a diagram illustrating an example of predicate score calculation according to the embodiment. As illustrated in FIG. 4, the predicate score calculation unit 11 calculates the amount of information $H_{op}(p)$ when the predicate p transitions to the object $o_p$, for all the predicates (edges) p in the knowledge graph. For example, when the predicate p is "line" and the object $o_p$ is "Tokyu Toyoko Line", the amount of information $H_{op}(p)$ when the predicate p transitions to the object $o_p$ is calculated as follows. In the knowledge graph, the total number of predicates "line" is 7. The number of predicates "line" that transition to the object "Tokyu Toyoko Line" is 2. The probability $P(o_p)$ that the predicate p transitions to the object $o_p$ when the predicate p is "line" and the object $o_p$ is "Tokyu Toyoko Line" is 2/7. Therefore, the amount of information $H_{op}(p)$ when the predicate p transitions to the object $o_p$ in such a case is calculated to be 1.81 according to the equation (1). Similarly, for all the predicates p, the amount of information $H_{op}(p)$ when the predicate p transitions to the object $o_p$ is calculated according to the equation (1). The calculated amount of information $H_{op}(p)$ is linked with the corresponding predicate and is written next to "H".

[Example of Integration Score Calculation]

Figure 5:
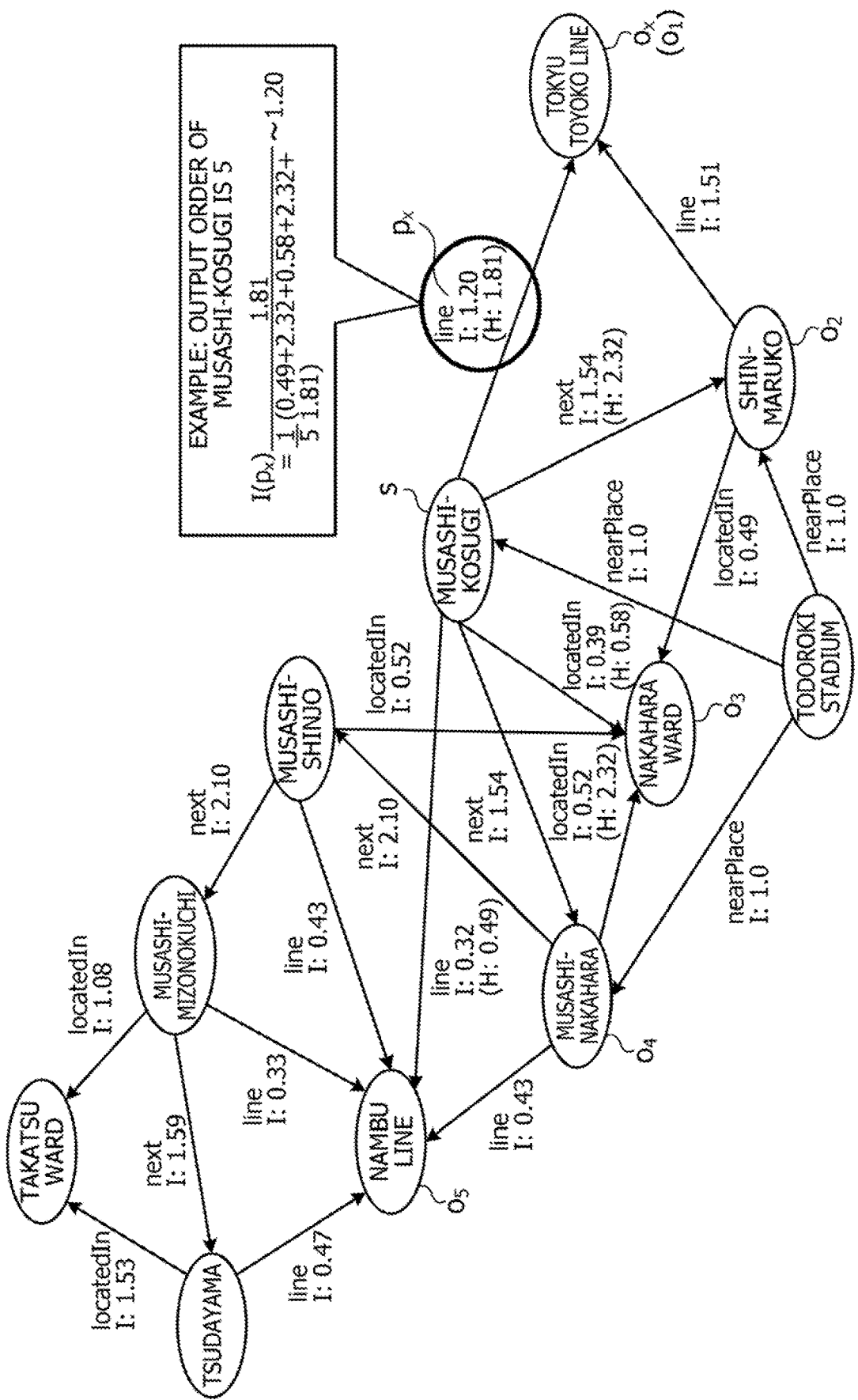
FIG. 5 is a diagram illustrating an example of an integration score calculation according to the embodiment.

FIG. 5 is a diagram illustrating an example of integration score calculation according to the embodiment. As illustrated in FIG. 5, for all the predicates (edges) $p_x$ in the knowledge graph, the integration score calculation unit 12 calculates the integration score $I(p_x)$ of the predicate $p_x$ having the subject s, where the output order of the subject s is n, and the score of the predicate $p_n$ corresponding to the object on of the subject s is $H_{opn}(p_n)$. For example, when the subject s is "Musashi-Kosugi" and the object $o_x(o_1)$ is "Tokyu Toyoko Line", the integration score $I(p_x)$ of the predicate $p_x$ having the subjects is calculated as follows. The output order n of the subject s when the subject s is "Musashi-Kosugi" is "5" that indicates the transition to the object "Tokyu Toyoko Line" ($o_x$ or $o_1$), the transition to the object "Shin-Maruko" ($o_2$), the transition to the object "Nakahara Ward" ($o_3$), the transition to the object "Musashi-Nakahara" ($o_4$), and the transition to the object "Nambu Line" ($o_5$). The amount of information (score) of the predicate "line" ($p_x$ or $p_1$) corresponding to the object "Tokyu Toyoko Une" ($o_x$ or $o_1$) of the subject s when the subject s is "Musashi-Kosugi" is "1.81". The amount of information (score) of the predicate "next" ($p_2$) corresponding to the object "Shin-Maruko" ($o_2$) of the subject s when the subject s is "Musashi-Kosugi" is "2.32". The amount of information (score) of the predicate "locatedIn" ($p_3$) corresponding to the object "Nakahara Ward" ($o_3$) of the subjects when the subjects is "Musashi-Kosugi" is "0.58". The amount of information (score) of the predicate "next" ($p_4$) corresponding to the object "Musashi-Nakahara" ($o_4$) of the subjects when the subject s is "Musashi-Kosugi" is "2.32". The amount of information (score) of the predicate "line" ($p_5$) corresponding to the object "Nambu Line" ($o_5$) of the subjects when the subject s is "Musashi-Kosugi" is "0.49". Therefore, the integration score $I(p_x)$ of the predicate $p_x$ in such a case is calculated to be 1.20 according to the equation (2). For example, the integration score $I(p_x)$ of the predicate $p_x$ is calculated to be a value obtained by dividing the value of the amount of information (score) of the predicate $p_x$ by the mean value of the values of the amounts of information (scores) of the n predicates possessed by the subject s. Similarly, for all the predicates $p_x$, the integration scores $I(p)$ are calculated according to the equation (2). The calculated integration score $I(p_x)$ is linked with the corresponding predicate and is written next to "I".

[Example of Clustering]

Figure 6:
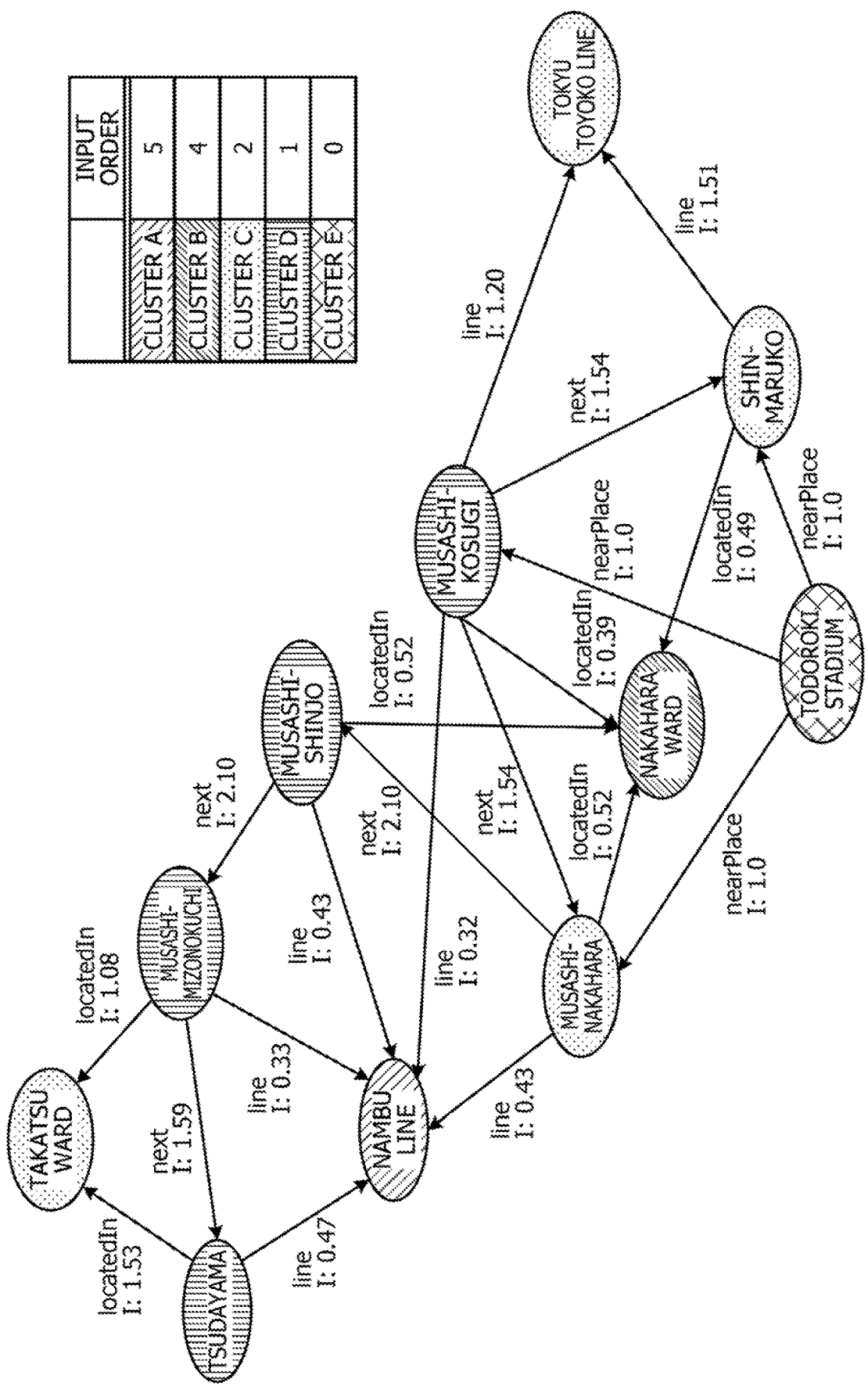
FIG. 6 is a diagram illustrating an example of clustering according to the example.

FIG. 6 is a diagram illustrating an example of clustering according to the embodiment. As illustrated in FIG. 6, the dustering unit 13 dusters the object entity according to the input order of the predicate that transitions to the object. For "Nambu Line" serving as the object, the input order of the predicate that transitions to the object indicates "5". For "Nakahara Ward" serving as the object, the input order of the predicate that transitions to the object indicates "4". For each of "Takatsu Ward", "Musashi-Nakahara", "Shin-Maruko", and "Tokyu Toyoko Line" serving as the object, the input order of the predicate that transitions to the object indicates "2". For each of "Tsudayama", "Musashi-Mizonokuchi", "Musashi-Shinjo", and "Musashi-Kosugi" serving as the object, the input order of the predicate that transitions to the object indicates "1". For "Todoroki stadium" serving as the object, the input order of the predicate that transitions to the object indicates "0". Therefore, the object "Nambu Line" that indicates the input order of "5" is determined as one duster (duster A). The object "Nakahara Ward" that indicates the input order of "4" is determined as one duster (duster B). The objects "Takatsu Ward", "Musashi-Nakahara", "Shin-Maruko", and "Tokyu Toyoko Une" that indicate the input order of "2" are determined as one duster (duster C). The objects "Tsudayama", "Musashi-Mizonokuchi", "Musashi-Shinjo", and "Musashi-Kosugi" that indicate the input order of "1" are determined as one duster (duster D). The object "Todoroki stadium" that indicates the input order of "0" is determined as one duster (duster E).

[Example of Reduction Number Assignment]

FIG. 7A and FIG. 78 are diagrams illustrating an example of the reduction number assignment according to the embodiment. As illustrated in FIG. 7A, suppose that the total number of predicates to be reduced is "10". The number of predicate sets that transition to the duster A is "5". The number of predicate sets that transition to the duster B is "4". The number of predicate sets that transition to the duster C is "8". The number of predicate sets that transition to the duster D is "4". The number of predicate sets that transition to the duster E is "0".

Under such a situation, the reduction number assignment unit 14 excludes the dusters having the predicate input order of "0" or "1" from the dusters A to E to which the number of predicates to be reduced is assigned. The duster D having the input order of "1" is excluded. The duster E having the input order of "0" is excluded.

After excluding the dusters, the reduction number assignment unit 14 first assigns "1" to the dusters A to C as the assignment number (a1). The remaining number of predicates to be reduced is "7".

For each duster, the reduction number assignment unit 14 calculates the assignment number/the number of predicates that transition to the duster, and 1 is added to the assignment number of the duster with the smallest calculation result.

Since the assignment number/the number of predicates that transition to the duster is ⅕ for the duster A, ¼ for the duster B, and ⅛ for the duster C, 1 is added to the assignment number of the duster C with the smallest calculation result (a2). The remaining number of predicates to be reduced is "6".

Similarly, for each duster, the reduction number assignment unit 14 calculates the assignment number/the number of predicates that transition to the duster, and adds 1 to the assignment number of the duster with the smallest calculation result. Since the assignment number/the number of predicates that transition to the duster is ⅕ for the duster A, ¼ for the duster B, and ⅖ for the duster C, 1 is added to the assignment number of the duster A with the smallest calculation result (a3). The remaining number of predicates to be reduced is "5".

Similarly, for each duster, the reduction number assignment unit 14 calculates the assignment number/the number of predicates that transition to the duster, and adds 1 to the assignment number of the duster with the smallest calculation result. Since the assignment number/the number of predicates that transition to the duster is ⅖ for the duster A, ¼ for the duster B, and ⅖ for the duster C, 1 is added to the assignment numbers of the dusters B and C with the smallest calculation result (a4). The remaining number of predicates to be reduced is "3".

Similarly, for each duster, the reduction number assignment unit 14 calculates the assignment number/the number of predicates that transition to the duster, and adds 1 to the assignment number of the duster with the smallest calculation result. Since the assignment number/the number of predicates that transition to the duster is ⅖ for the duster A, 2/4 for the duster B, and ⅜ for the duster C, 1 is added to the assignment number of the duster C with the smallest calculation result (a). The remaining number of predicates to be reduced is "2".

Similarly, for each duster, the reduction number assignment unit 14 calculates the assignment number/the number of predicates that transition to the duster, and adds 1 to the assignment number of the duster with the smallest calculation result. Since the assignment number/the number of predicates that transition to the duster is ⅖ for the duster A, 2/4 for the duster B, and 4/8 for the duster C, 1 is added to the assignment number of the duster A with the smallest calculation result (a6). The remaining number of predicates to be reduced is "1".

Similarly, for each duster, the reduction number assignment unit 14 calculates the assignment number/the number of predicates that transition to the duster, and adds 1 to the assignment number of the duster with the smallest calculation result. Since the assignment number/the number of predicates that transition to the duster is ⅗ for the duster A, 2/4 for the duster B, and 4/8 for the duster C, 1 is added to the assigned number of the duster with the smaller assignment number among the dusters B and C with the smallest calculation result (a7). The remaining number of predicates to be reduced is "0".

Since the remaining number of predicates to be reduced is "0", the reduction number assignment unit 14 terminates the reduction number assignment. As a result, the number of predicates to be reduced that is assigned to the duster A is "3". The number of predicates to be reduced that is assigned to the duster B is "3". The number of predicates to be reduced that is assigned to the duster C is "4".

[Example of Reduction Target Selection]

Figure 8:
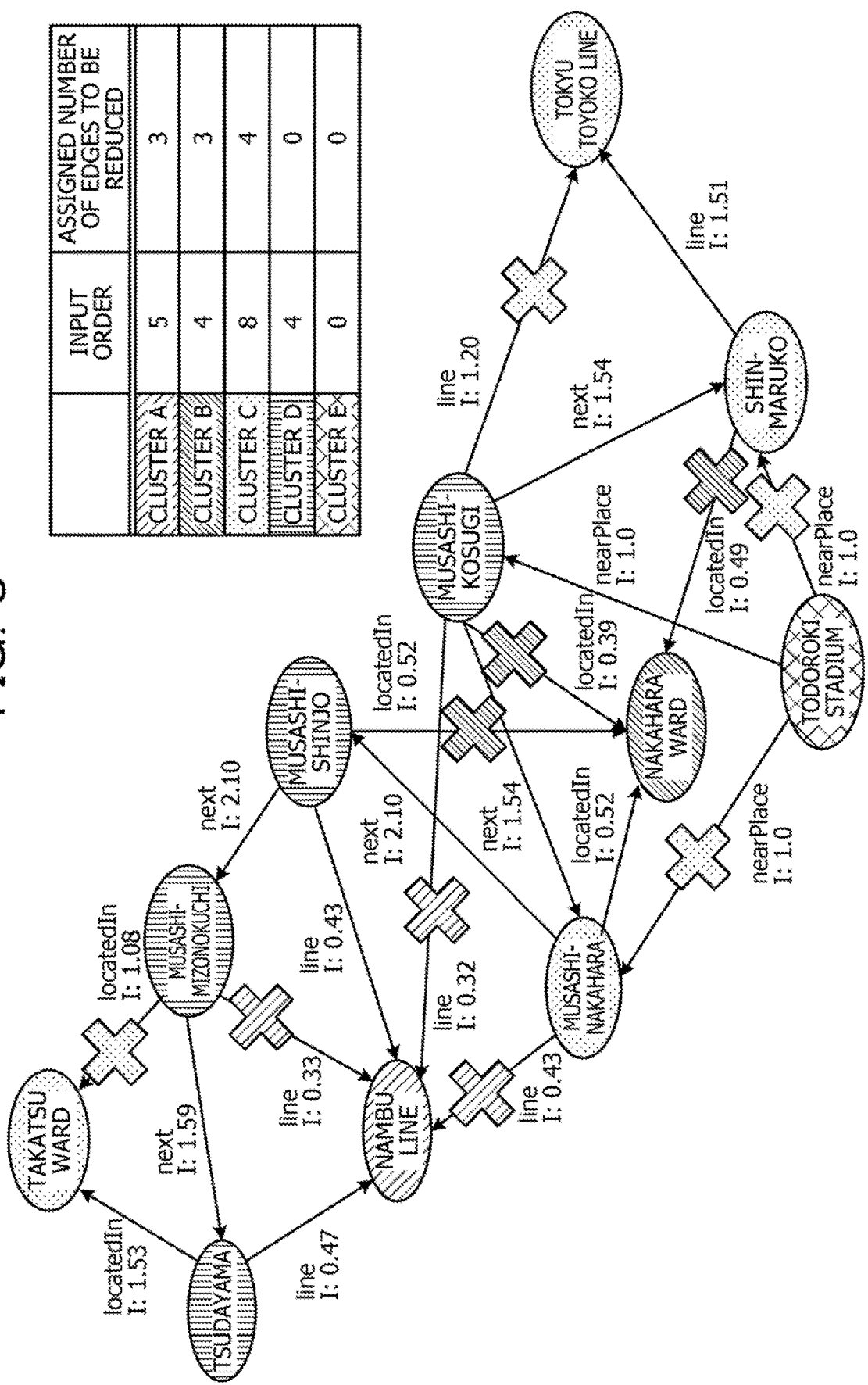
FIG. 8 is a diagram illustrating an example of reduction target selection according to the embodiment.

FIG. 8 is a diagram illustrating an example of reduction target selection according to the embodiment. As illustrated in FIG. 8, for each of the predicate sets (set of edges) that transition to the duster, the reduction target selection unit 15 deletes the predicates belonging to the predicate set in accordance with the assigned number of predicates to be reduced, in ascending order of the integration score. The number of predicates to be reduced that is assigned to the duster A is "3". Therefore, in ascending order of the integration score, the predicate from "Musashi-Kosugi" to "Nambu Line", the predicate from "Musashi-MizonokucN" to "Nambu Line", and the predicate from "Musashi-Nakahara" to the "Nambu Une" are deleted from the predicate sets that transtion to the duster A. The number of predicates to be reduced that is assigned to the duster B is "3". Therefore, in ascending order of the integration score, the predicate from "Musashi-Kosugi" to "Nakahara Ward", the predicate from "Shin-Maruko" to "Nakahara Ward", and the predicate from "Musashi-Shinjo" to "Nakahara Ward" are deleted from the predicate sets that transition to the duster B. The number of predicates to be reduced that is assigned to the duster C is "4". Therefore, in ascending order of the integration score, the predicate "Todoroki stadium" to "Shin-Maruko", the predicate from "Todoroki stadium" to "Musashi-Nakahara", the predicate from "Musashi-Mizonokuchi" to "Takatsu Ward", and the predicate from "Musashi-Kosugi" to "Tokyu Toyoko Une" are deleted from the predicate sets that transition to the duster C.

[Example of Reduction Result]

Figure 9:
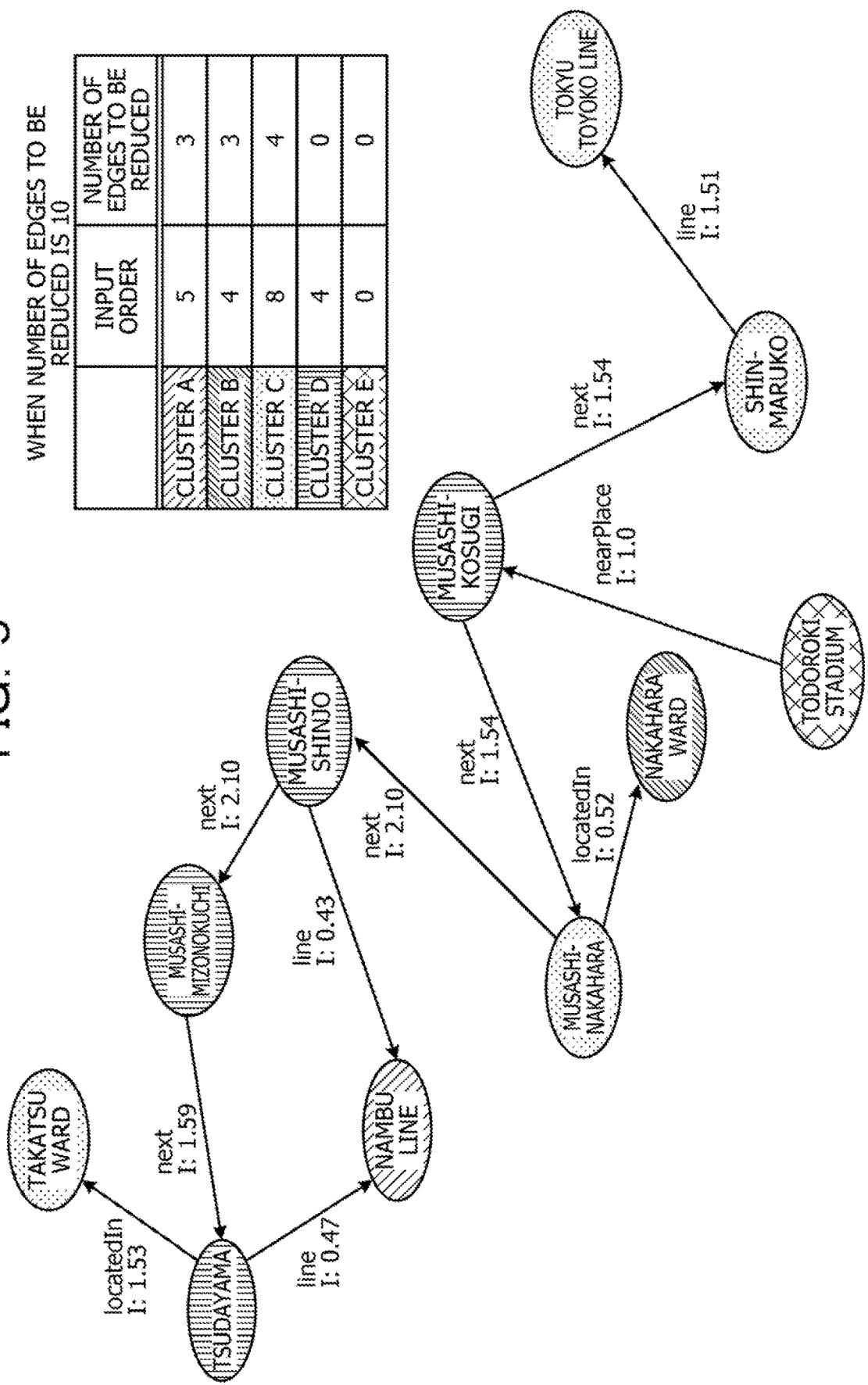
FIG. 9 is a diagram illustrating an example of a result of reduction according to the embodiment.

FIG. 9 is a diagram illustrating an example of a reduction result according to the embodiment. As illustrated in FIG. 9, the reduction target selection unit 15 generates a knowledge graph in which the predicates (edges) to be reduced are deleted. The newly generated knowledge graph is the graph illustrated in FIG. 9.

[Example of Entity Linking Execution]

Figure 10:
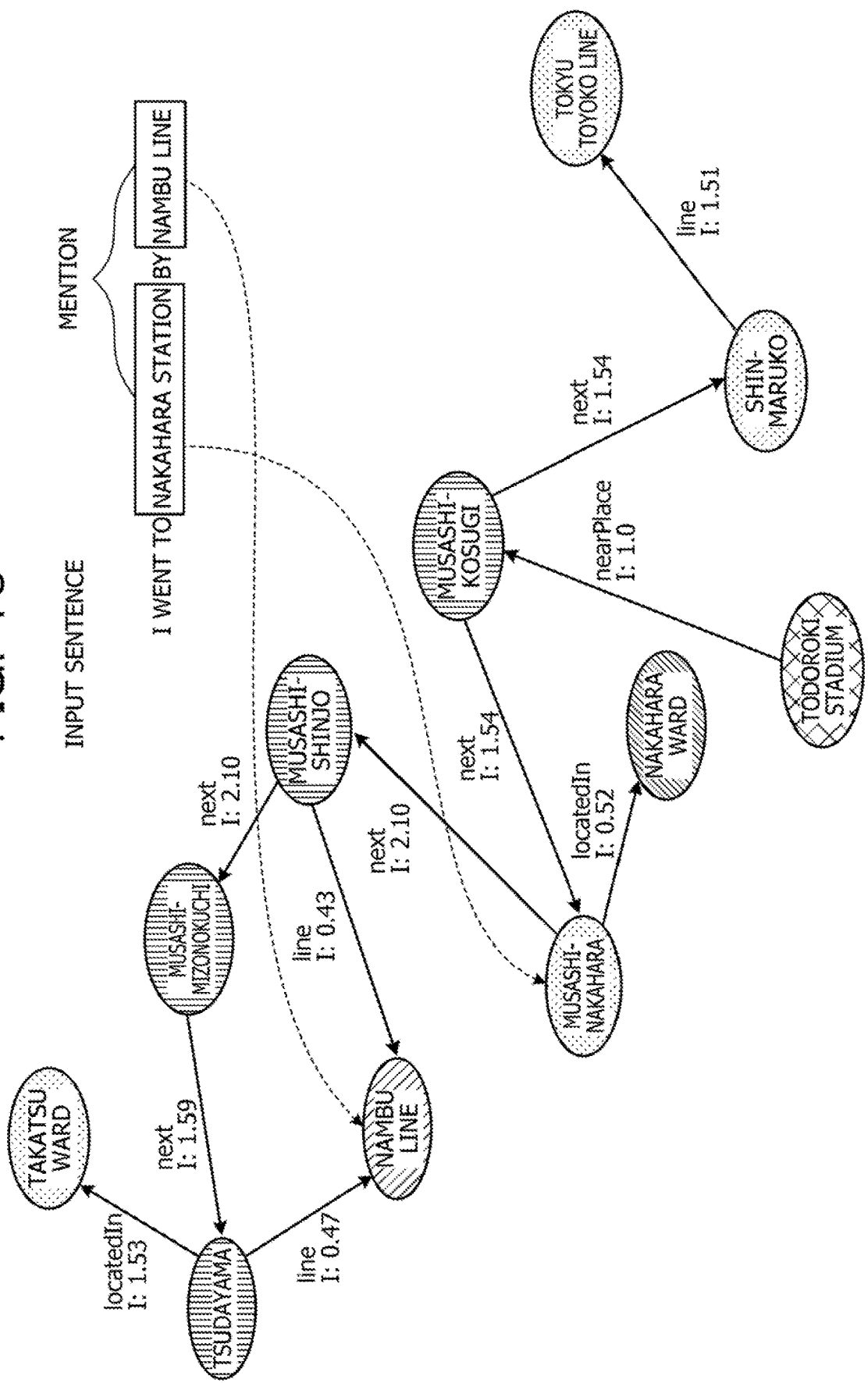
FIG. 10 is a diagram illustrating an example of entity linking execution according to the embodiment.

FIG. 10 is a diagram illustrating an example of entity linking execution according to the embodiment. As illustrated in FIG. 10, suppose that the input sentence is "I went to Nakahara Station by Nambu Une". The entity linking execution unit 16 links a word in the input sentence with an entity in the newly generated knowledge graph. The entity linking method may be any method. For example, since the word (mention) "Nambu Une" in the input sentence completely matches "Nambu Une" in the knowledge graph (knowledge base), the word "Nambu Une" in the input sentence and "Nambu Une" in the knowledge graph are linked. "Musashi-Nakahara" and "Nakahara Ward" are linking candidates in the knowledge graph (knowledge base) for the word (mention) "Nakahara Station" in the input sentence. In such a case, "Musashi-Nakahara" with a shorter path to "Nambu Une" is selected. For example, the word "Nakahara Station" in the input sentence and the "Musashi-Nakahara" in the knowledge graph are linked. For example, the entity linking execution unit 16 links the word in the input sentence with the node in the generated knowledge graph by coupling the subject node and the predicate node that are coupled by the deleted edge between "Musashi-Nakahara" and "Nambu Une", for example, via the node "Musashi-Shinjo" that is not deleted.

[Flowchart of Information Processing]

Figure 11:
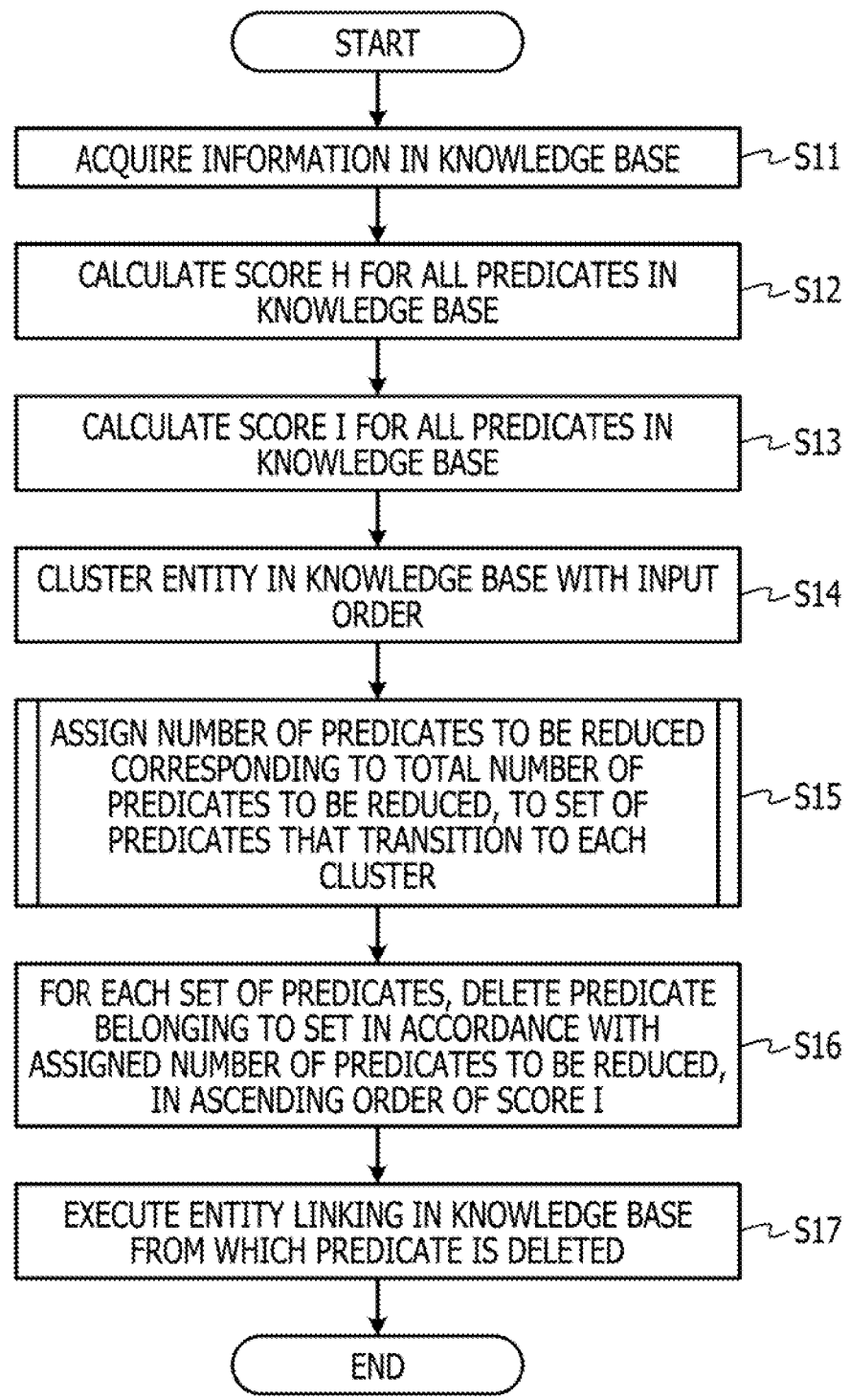
FIG. 11 is a diagram illustrating an example of a flowchart of information processing according to the embodiment.

FIG. 11 is a diagram illustrating an example of a flowchart of information processing according to the embodiment. As illustrated in FIG. 11, the predicate score calculation unit 11 acquires knowledge base information (step S11). The predicate score calculation unit 11 calculates a score H for all the predicates in the knowledge base (step S12). For example, when the probability that the predicate p transitions to the object $o_p$ is $P(o_p)$, the predicate score calculation unit 11 calculates a score $H_{op}(p)$ of the predicate p that transitions to the object $o_p$, based on the equation (1).

The integration score calculation unit 12 calculates the (integration) score I for all the predicates in the knowledge base (step S13). For example, the integration score calculation unit 12 calculates an integration score $I(p_x)$ of the predicate $p_x$ having the subjects, based on the equation (2), where the output order of the subject s is n, and the score of the predicate $p_n$ corresponding to the object on of the subject s is $H_{opn}(p_n)$.

The dustering unit 13 dusters the object entities in the knowledge base according to the input order (step S14).

The reduction number assignment unit 14 assigns the number of predicates to be reduced corresponding to the predetermined total number of predicates to be reduced, to the predicate sets that transition to each duster (step S15). The flowchart of such a reduction number assignment processing is described later.

For each of the predicate sets, the reduction target selection unit deletes the predicates belonging to the predicate set in accordance with the assigned number of predicates to be reduced, in ascending order of the (integration) score I, and generates a new knowledge base (knowledge graph) (step S16). The entity linking execution unit 16 executes the entity linking that links the word in the input sentence and the entity in the newly generated knowledge base (knowledge graph) (step S17).

[Flowchart of Reduction Number Assignment Processing]

Figure 12:
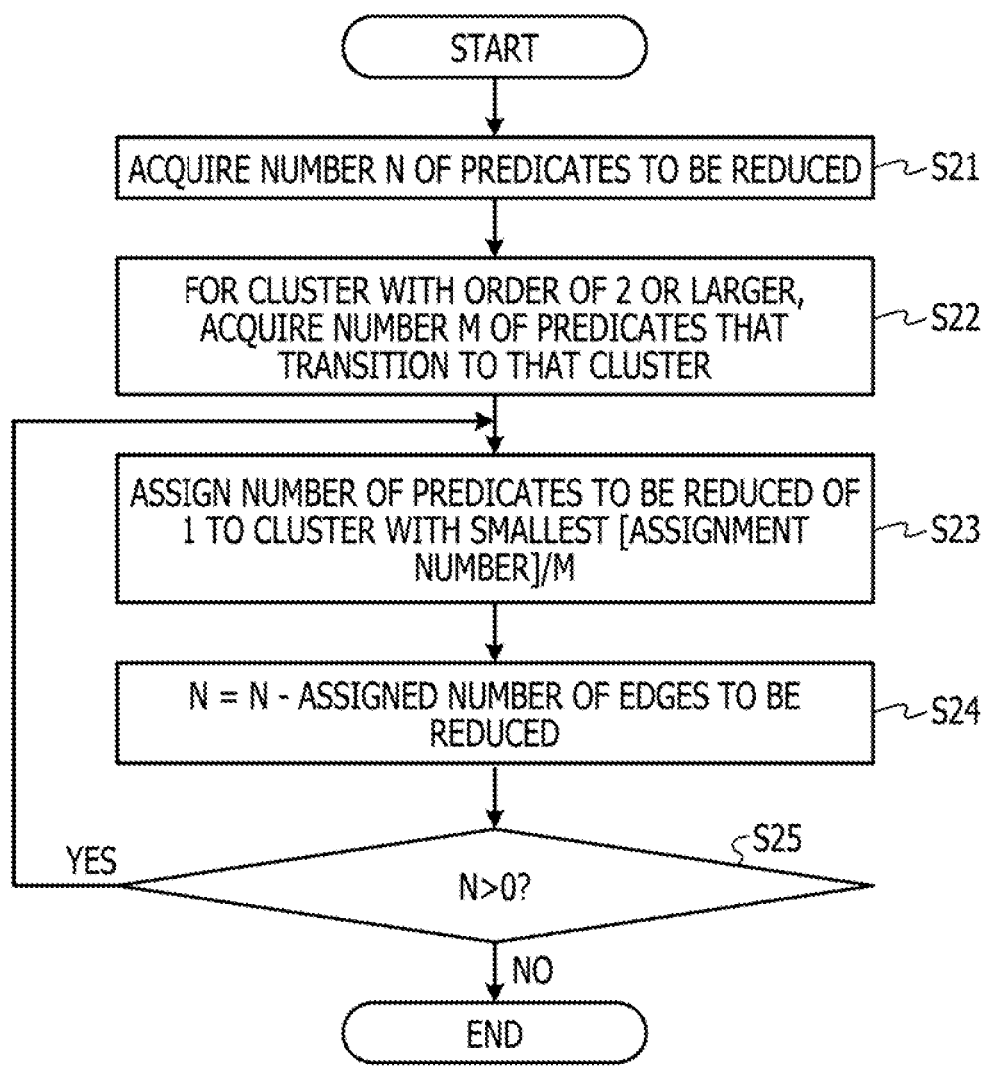
FIG. 12 is a diagram illustrating an example of a flowchart of reduction number assignment processing according to the embodiment.

FIG. 12 is a diagram illustrating an example of a flowchart of the reduction number assignment processing according to the embodiment. As illustrated in FIG. 12, the reduction number assignment unit 14 acquires a predetermined total number N of predicates to be reduced (step S21). For each duster having the predicate input order of 2 or larger, the reduction number assignment unit 14 acquires the number M of predicates that transition to the duster (step S22).

The reduction number assignment unit 14 assigns the number of predicates to be reduced of 1 to the duster having the smallest value of [the assignment number]/M among the plurality of dusters (step S23). When all values are the same, the reduction number assignment unit 14 assigns 1 to the duster with the largest input order. When a plurality of values are the same, the reduction number assignment unit 14 assigns 1 to the plurality of dusters.

The reduction number assignment unit 14 subtracts the assigned number of predicates to be reduced from the total number N of predicates to be reduced (step S24).

The reduction number assignment unit 14 determines whether the total number N of predicates to be reduced is larger than 0 (step S25). When it is determined that the total number N of predicates to be reduced is larger than 0 (step S25; Yes), the process proceeds to step S23 so that the reduction number assignment unit 14 further assigns the number of predicates to be reduced.

On the other hand, when it is determined that the total number N of predicates to be reduced is not larger than 0 (step S25; No), the reduction number assignment unit 14 terminates the reduction number assignment processing.

[Reference Example of Case where Reduction is Performed without Clustering]

Figure 13:
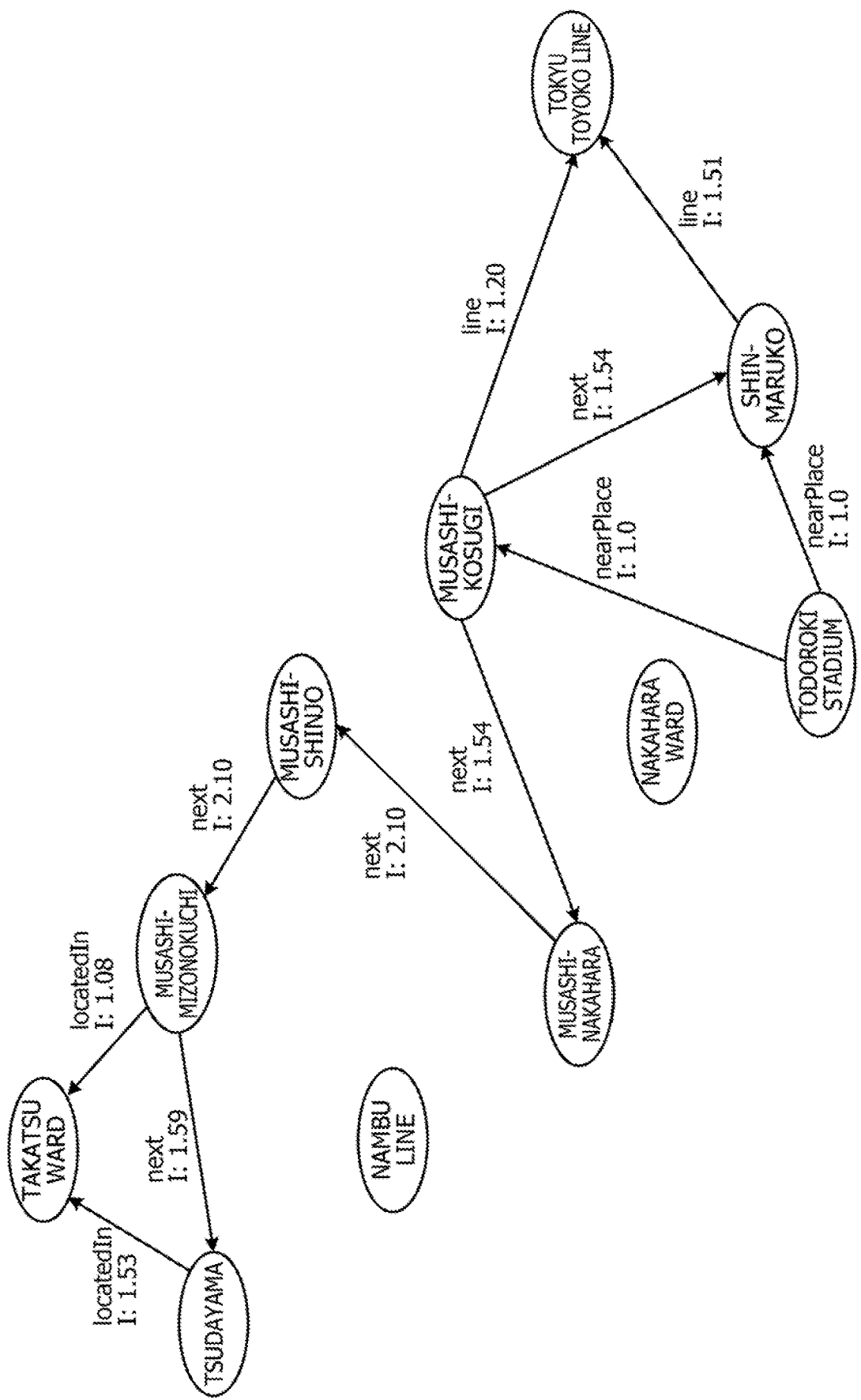
FIG. 13 is a diagram illustrating a reference example of a result of reduction without clustering in the order of scores.

A reference example of a case where reduction is performed without clustering is described with reference to FIG. 13 and FIG. 14. FIG. 13 is a diagram illustrating the reference example of a result of reduction performed in the order of the scores without clustering. As illustrated in FIG. 13, as many edges as the predetermined total number of predicates to be reduced are selected as edges to be reduced in sequence from the edge with the smallest integration score I. The edges to be reduced in the knowledge graph are deleted. The newly generated knowledge graph is the graph illustrated in FIG. 13. The edge coupled to "Nambu Une" is lost. The edge coupled to "Nakahara Ward" is lost.

Figure 14:
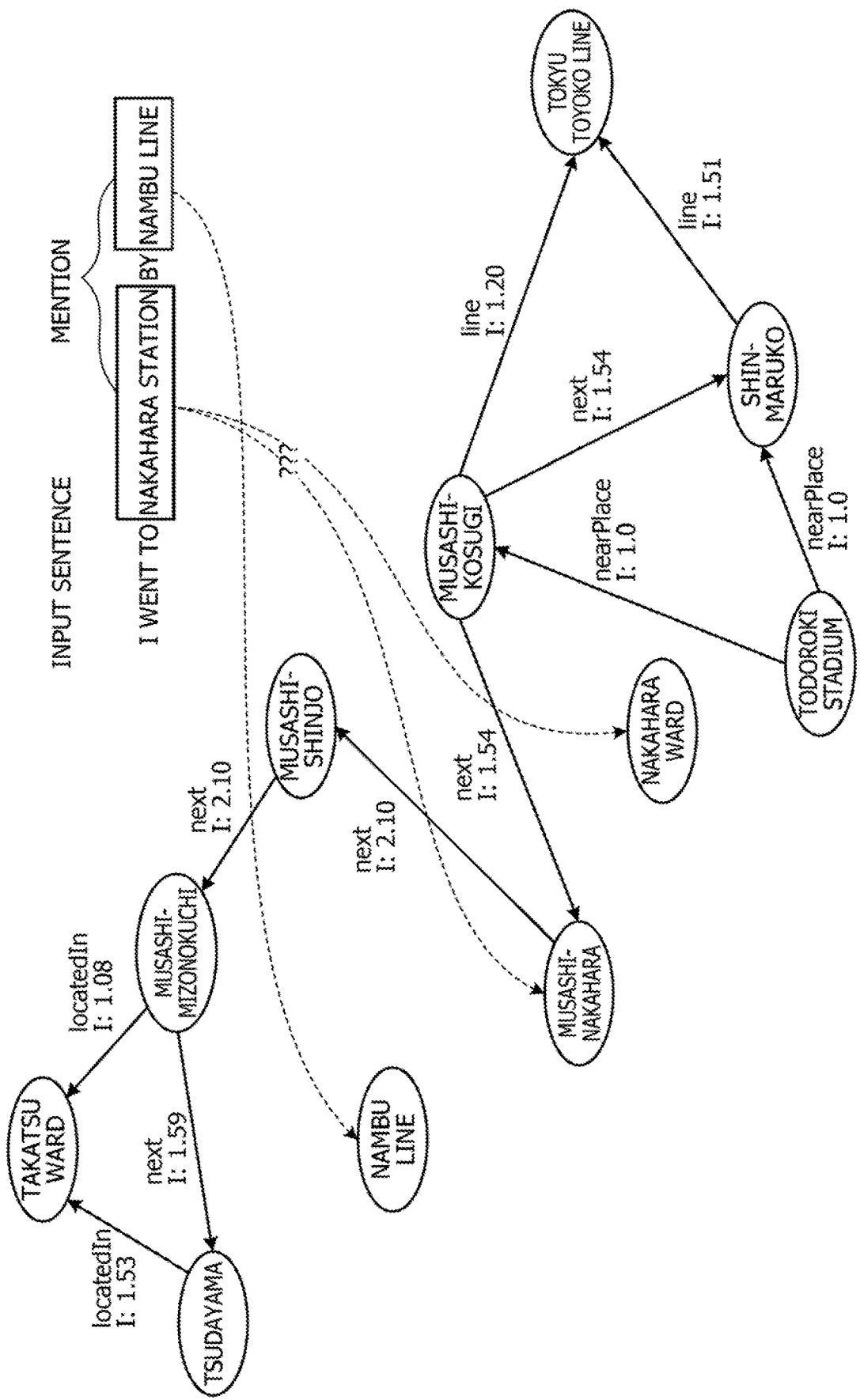
FIG. 14 is a diagram illustrating a reference example of the entity linking execution in the case of reduction without clustering in the order of the scores.

FIG. 14 is a diagram illustrating a reference example of the entity linking execution when reduction is performed in the order of the scores without dustering. Suppose that the input sentence is "I went to Nakahara Station by Nambu Une", as illustrated in FIG. 14. The entity linking is executed to link the word in the input sentence with the entity in the newly generated knowledge graph. Since the word (mention) "Nambu Une" in the input sentence completely matches "Nambu Une" in the knowledge graph (knowledge base), the word "Nambu Line" in the input sentence and "Nambu Line" in the knowledge graph are linked. "Musashi-Nakahara" and "Nakahara Ward" are the linking candidates in the knowledge graph (knowledge base) for the word (mention) "Nakahara Station" in the input sentence. In such a case, however, since the edges respectively coupled to "Nambu Une" and "Nakahara Ward" are lost, it is unclear whether "Nakahara Station" in the input sentence is linked with" Musashi-Nakahara" or "Nakahara Ward". For example, since the edges that are important for the entity linking are lost, the accuracy of the entity linking is degraded.

[Effects of Embodiment]

According to the above-described embodiment, the information processing apparatus 1 specifies an edge to be deleted from among edges coupled to a second node that has a preset order in a knowledge graph, based on the number of the edges coupled to a first node that serves as a transition source and the number of edges coupled to the second node that serves as a transition destination in the knowledge graph. The information processing apparatus 1 generates a knowledge graph from which the specified edge is deleted. The information processing apparatus 1 couples the first node and the second node that have been coupled by the deleted edge, via a third node coupled by an undeleted edge, and presents a word in a text and the entity linked with the word to a user. According to such a configuration, the information processing apparatus 1 reduces the amount of information of the knowledge graph by deleting the edge from the knowledge graph, but may maintain the accuracy of the entity linking.

According to the above-described embodiment, the information processing apparatus 1 dusters the second node in accordance with an order of edges that transition to the second node that serves as the transition destination. The information processing apparatus 1 assigns the number of predicates to be reduced corresponding to a predetermined total number of edges to be reduced, to a set of edges that transition to each duster obtained by the dustering. The information processing apparatus 1 specifies, for each set of edges, as many edges to be deleted as the assigned number of predicates to be reduced. According to such a configuration, as compared with the case where the edges to be deleted are specified in ascending order of the scores, the information processing apparatus 1 may reduce the amount of information of the knowledge graph while maintaining the accuracy of the entity linking, by dustering the second node using the input order of the edges to the second node and assigning the number of edges to be reduced to each duster.

According to the above-described embodiment, the information processing apparatus 1 further specifies, as edges to be reduced, as many edges as the assigned number of edges to be reduced from the set of edges, in ascending order of importance. According to such a configuration, the information processing apparatus 1 may reduce the amount of information of the knowledge graph while maintaining the accuracy of entity linking, as compared with the case where the edges to be deleted are specified in the entire knowledge graph in ascending order of the scores.

[Others]

It is not necessarily desirable that individual components of the illustrated Information processing apparatus 1 be physically configured as illustrated. For example, the specific configurations regarding distribution and integration of the information processing apparatus 1 are not limited to the illustrated configuration. The information processing apparatus 1 may be configured by functionally or physically distributing and integrating all or part of the components in any units, in accordance with various loads, usage states, and the like. For example, the reduction number assignment unit 14 may be separated into an exclusion unit that excludes a duster to which the number of predicates to be reduced is assigned and an assignment unit that assigns the number of predicates to be reduced to a duster other than the excluded duster. The predicate score calculation unit 11 and the integration score calculation unit 12 may be integrated to form a score calculation unit. A storage unit for storing the knowledge base 21, the predicate score storage unit 22, the integration score storage unit 23, and the like may be coupled via a network as an external device of the information processing apparatus 1.

Figure 15:
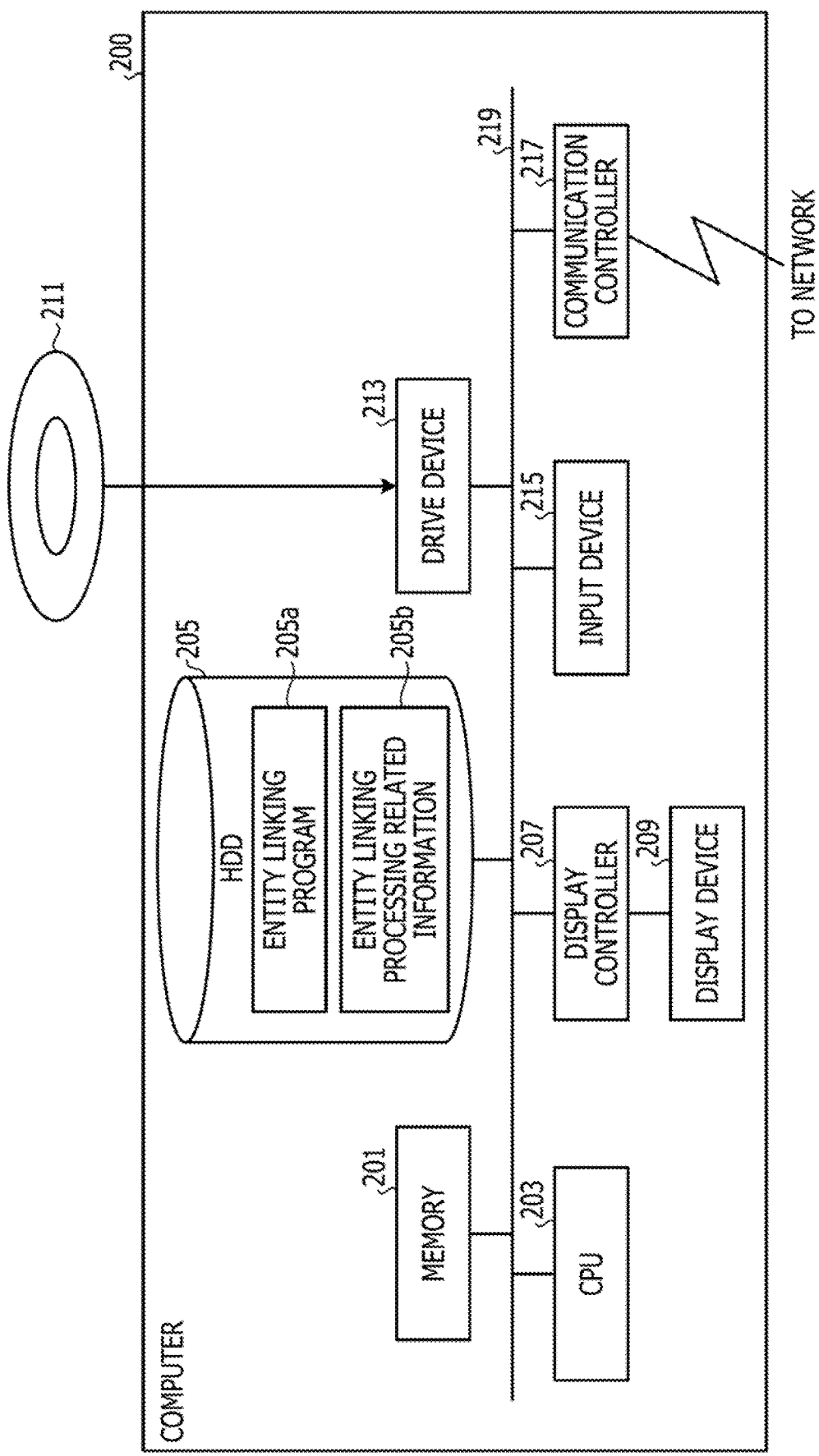
FIG. 15 is a diagram illustrating an example of a computer that executes an entity linking program.

The various processes described in the above embodiment may be implemented as a result of a computer such as a personal computer or a workstation executing a program prepared in advance. Hereinafter, a description is given of an example of the computer that executes an entity linking program for implementing functions similar to the functions of the information processing apparatus 1 illustrated in FIG. 1. FIG. 15 is a diagram illustrating an example of the computer that executes the entity linking program.

As illustrated in FIG. 15, a computer 200 includes a CPU 203 that executes various types of arithmetic processes, an input device 215 that receives input of data from a user, and a display controller 207 that controls a display device 209. The computer 200 includes a drive device 213 that reads the program and the like from a storage medium, and a communication controller 217 that exchanges data with another computer via a network. The computer 200 includes a memory 201 that temporarily stores various types of information and a hard disk drive (HDD) 205. The memory 201, the CPU 203, the HDD 205, the display controller 207, the drive device 213, the input device 215, and the communication controller 217 are coupled to each other by a bus 219.

The drive device 213 is, for example, a device for a removable disk 211. The HDD 205 stores an entity linking program 205a and entity linking processing related information 205b.

The CPU 203 reads the entity linking program 205a to deploy the entity linking program 205a in the memory 201, and executes the entity linking program 205a as a process. Such a process corresponds to each of the functional units of the information processing apparatus 1. The entity linking processing related information 205b corresponds to the knowledge base 21, the predicate score storage unit 22, the integration score storage unit 23, and the duster information storage unit 24. For example, the removable disk 211 stores various kinds of information such as the entity linking program 205a.

The entity linking program 205a may not be necessarily stored in the HDD 205 from the beginning. For example, the entity linking program 205a may be stored in a "portable physical medium" such as a flexible disk (FD), a compact disk read-only memory (CD-ROM), a digital versatile disk (DVD), a magneto-optical disk, or an integrated circuit (IC) card inserted into the computer 200. The computer 200 may read the entity linking program 205a from the portable physical medium and execute the entity linking program 205a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method performed by a computer, the method comprising:

linking an entity in a first knowledge graph with a word in a text;

based on a number of first edges coupled to each of first nodes that serve as a transition source and a number of second edges coupled to each of second nodes that serve as a transition destination in the first knowledge graph, identifying a third edge to be deleted from edges coupled to a third node among the second nodes which has a preset input order indicating a number of edges that transition to the third node;

generating a second knowledge graph by deleting the third edge from the first knowledge graph; and coupling a first node among the first nodes and a second node among the second nodes which have been coupled to each other by the third edge in the first knowledge graph, via a fourth node to which the first node and the second node are coupled by edges in the second knowledge graph, and providing the word in the text and the entity linked with the word to a user, wherein the identifying includes:

dividing the second nodes into clusters of nodes by clustering the second nodes in accordance with an input order indicating a number of edges that transition to each of the second nodes, in accordance with a predetermined total number of edges to be reduced, assigning a first number indicating a number of edges to be reduced to a set of edges that transition to each of the clusters of nodes, and identifying, for each of the clusters of nodes, the first number of edges to be deleted from the set of edges.

2. The method of claim 1, wherein the identifying further includes identifying, as the first number of edges to be deleted from the set of edges, edges in ascending order of importance from among the set of edges.

3. An apparatus comprising:

a memory; and a processor coupled to the memory and configured to:

link an entity in a first knowledge graph with a word in a text, based on a number of first edges coupled to each of first nodes that serve as a transition source and a number of second edges coupled to each of second nodes that serve as a transition destination in the first knowledge graph, identify a third edge to be deleted from edges coupled to a third node among the second nodes which has a preset input order indicating a number of edges that transition to the third node, generate a second knowledge graph by deleting the third edge from the first knowledge graph, and couple a first node among the first nodes and a second node among the second nodes which have been coupled to each other by the third edge in the first knowledge graph, via a fourth node to which the first node and the second node are coupled by edges in the second knowledge graph, and provide the word in the text and the entity linked with the word to a user, wherein the identification of the third edge includes:

dividing the second nodes into clusters of nodes by clustering the second nodes in accordance with an input order indicating a number of edges that transition to each of the second nodes, in accordance with a predetermined total number of edges to be reduced, assigning a first number indicating a number of edges to be reduced to a set of edges that transition to each of the clusters of nodes, and identifying, for each of the clusters of nodes, the first number of edges to be deleted from the set of edges.

4. A non-transitory, computer-readable recording medium having stored therein a program for causing a computer to execute a process comprising:

linking an entity in a first knowledge graph with a word in a text;

based on a number of first edges coupled to each of first nodes that serve as a transition source and a number of second edges coupled to each of second nodes that serve as a transition destination in the first knowledge graph, identifying a third edge to be deleted from edges coupled to a third node among the second nodes which has a preset input order indicating a number of edges that transition to the third node;

generating a second knowledge graph by deleting the third edge from the first knowledge graph; and coupling a first node among the first nodes and a second node among the second nodes which have been coupled to each other by the third edge in the first knowledge graph, via a fourth node to which the first node and the second node are coupled by edges in the second knowledge graph, and providing the word in the text and the entity linked with the word to a user, wherein the identifying includes:

dividing the second nodes into clusters of nodes by clustering the second nodes in accordance with an input order indicating a number of edges that transition to each of the second nodes, in accordance with a predetermined total number of edges to be reduced, assigning a first number indicating a number of edges to be reduced to a set of edges that transition to each of the clusters of nodes, and identifying, for each of the clusters of nodes, the first number of edges to be deleted from the set of edges.

* * * * *